United States Patent [19]
Suzuki

[11] Patent Number: 5,918,572
[45] Date of Patent: Jul. 6, 1999

[54] STRUCTURE FOR SUCTION PIPE OF AN ENGINE

[75] Inventor: Takehiro Suzuki, Hamamatsu, Japan

[73] Assignee: Suzuki Motor Corporation, Shizuoka-ken, Japan

[21] Appl. No.: 09/141,366

[22] Filed: Aug. 27, 1998

[30] Foreign Application Priority Data

Oct. 24, 1997 [JP] Japan .................................. 9-292205

[51] Int. Cl.⁶ ...................................................... F01N 1/02
[52] U.S. Cl. ...................... 123/184.57; 181/250; 181/229
[58] Field of Search ........................... 123/184.57, 198 E, 123/184.53, 184.61; 181/229, 250; 374/144

[56] References Cited

U.S. PATENT DOCUMENTS

| | | | |
|---|---|---|---|
| 4,800,985 | 1/1989 | Hanzawa et al. | 181/229 |
| 5,107,800 | 4/1992 | Araki et al. | 123/152 MB |
| 5,529,743 | 6/1996 | Powell | 264/513 |
| 5,723,828 | 3/1998 | Nakagawa | 181/250 |

*Primary Examiner*—Noah P. Kamen
*Assistant Examiner*—Brian J. Hairston
*Attorney, Agent, or Firm*—Nath & Associates; Gary M. Nath

[57] ABSTRACT

On an annular lib 16 formed at the downstream of an upper cylinder portion 3a of an air-cleaner outlet hose 3, a hose connecting portion 3f is formed to which one end of a resonator 6 is connected, and an intermediate portion 6c of the resonator 6 is fastened at a resonator clamp portion 3h formed in a unit with the upper cylinder portion 3a at the upstream. Further, on the above mentioned annular lib 16 provided adjacent to the bellows portion 3c of the air-cleaner outlet hose 3 a suction air temperature sensor 4 is provided at a position which is not opposing to the position of the resonator, and a harness clamp portion 3e of the suction air temperature sensor 4 is provided. Due to the floating support of the resonator, a reduction of the vibration transmission to the vehicle chamber and the number of the parts and the mounting processes is realized, and eventually a cost down is realized. Further, since the parts are disposed on the annular lib 16, the rigidity of the bellows portions 3c close thereto is increased.

4 Claims, 5 Drawing Sheets

STRUCTURE FOR SUCTION PIPE OF AN ENGINE

BACKGROUND OF THE INVENTION

1. Field of Invention

This invention relates to a structure for a suction pipe for an engine of vehicle, which installs an air-cleaner outlet hose connecting the air cleaner and a throttle body.

2. Background of Related Art

Conventionally, a suction system of an engine installed in a vehicle comprises an air cleaner and a throttle body, wherein air is supplied to each cylinder through an intake manifold, and these are disposed in each given space of an engine room.

In the suction system of the engine shown in FIG. 6, an air-cleaner outlet hose 3 connecting an air cleaner 1 and a throttle body 2 is constituted from a bellows portion 3c provided with connecting cylinder portions 3a and 3b on both ends thereof, to make the connecting work easy. At the connecting cylinder portion (an upper cylinder portion 3a) a mounting hole 3d for a suction air temperature sensor 4 and a harness clamp portion 3e for fixing a harness 5 of the sensor 4 are provided. Further, at the connecting cylinder portion (a lower cylinder portion 3b) of the side of the throttle body 2 a mounting hole 3f for a resonator 6 and a mounting hole 3g for a breather pipe 7 (see FIG. 7) are provided.

Other than this structure, there has been proposed such a suction system, wherein a resonator which is extended along the suction pipe is provided at the upstream of the suction path (JP Laid-open Publication No. Hei 4-12161), or wherein the resonator is disposed at the upstream more than the air cleaner (JP Laid-open Publication No. Sho 61-190159).

When assembling the above parts, the suction air temperature sensor 4 is pressed into the mounting hole 3d of the upper cylinder portion 3a to provide the detecting portion inside the path, and the harness 5 extended from the suction air temperature sensor 4 is mounted on the harness clamp portion 3e of the upper cylinder portion 3a. The breather pipe 7 is disposed by being pressed into the upper mounting hole 3g of the lower cylinder portion 3b.

The resonator 6 is pressed into the mounting hole 3f of the lower cylinder portion 3b, a connecting portion is clamped by the clamp 8e and a distal end side of the resonator 6 is fixed by a welding nut 14 of the bracket 13, which is welded to the intake manifold 12 through a bolt 9, a cushion 10 and a washer 11. Further, the surrounding portion of the air cleaner 1 is rigidly fixed by disposing the bracket 15 at its front and rear.

However, since the mounting work of the resonator 6 in the engine room is carried out by fixing the bolt 9, the cushion 10, the washer 11 and the welding nut 14 fixed on the intake manifold 12, it is complicated and takes a long time to work due to many parts to be used and mounting processes to cause to increase the production cost.

Further, the air-cleaner outlet hose 3 is required to have a structure to endure a negative pressure generated in the hose 3 caused by the air passing resistance in the air cleaner 1. As to this resistance against the negative pressure, the bellows portion 3c is the weakest. In case of reinforcing the bellows portion 3c by thickening its wall, since a performance of absorbing the vibration is lowered, normally, a plurality of annular lib and the like are provided inside the bellows portion 3c. However, in this case, it will cause an increase of not only a weight of a production but also production cost.

Accordingly, it is an object of the present invention to provide a suction pipe structure by improving a mounting workability of the resonator on the air-cleaner outlet hose and increasing the rigidity thereof.

SUMMARY OF THE INVENTION

In the present invention, the feature resides in that a structure of suction pipe for an engine comprises an air-cleaner outlet hose, a hose connecting portion provided on the air-cleaner outlet hose, and a resonator, one end of which is connected to the hose connecting portion and an intermediate portion thereof is fixed to a position different from a position of the hose connecting portion on the air-cleaner outlet hose.

The feature resides in that, the air-cleaner outlet hose is composed of an upper cylinder portion and a lower cylinder portion, the hose connecting portion is provided at the downstream of the upper cylinder portion, and a resonator clamp portion is provided in a unit with the upper cylinder portion at the upstream of the upper cylinder portion.

Another feature resides in that a structure of suction pipe for an engine comprises an air-cleaner outlet hose and an annular lib provided on the air-cleaner outlet hose as a reinforcing member.

Another feature resides in that the air-cleaner outlet hose is composed of an upper cylinder portion, a lower cylinder portion and a bellows portion therebetween, the annular lib is provided close to the bellows portion, a resonator and a suction air temperature sensor are provided on the annular lib in such a manner as they are positioned on a plane perpendicular to a center line of the air-cleaner outlet hose, and a harness clamp portion for the sensor is provided on the annular lib.

Another feature resides in that the a resonator and a suction air temperature sensor are provided as the reinforcing member in such a manner as a position of the sensor is deviated from an opposing position of the resonator in a circumferential direction.

The above resonator is a side branch type, in which the resonator disposed in an engine room in such a manner as, while being provided along the suction pipe, one end of the resonator is connected to a connecting portion and the intermediate portion thereof is fixed with a clamp portion to constitute a floating structure. Further, the resonator is bent in a twisting direction around the suction pipe and a free end thereof provided ahead of the clamped portion is bent reversely in the twisting direction.

DETAILED DESCRIPTION OF PREFERRED EMBODIMENTS

Hereinafter, one embodiment of the present invention is explained based on the attached drawings.

Figure 3:
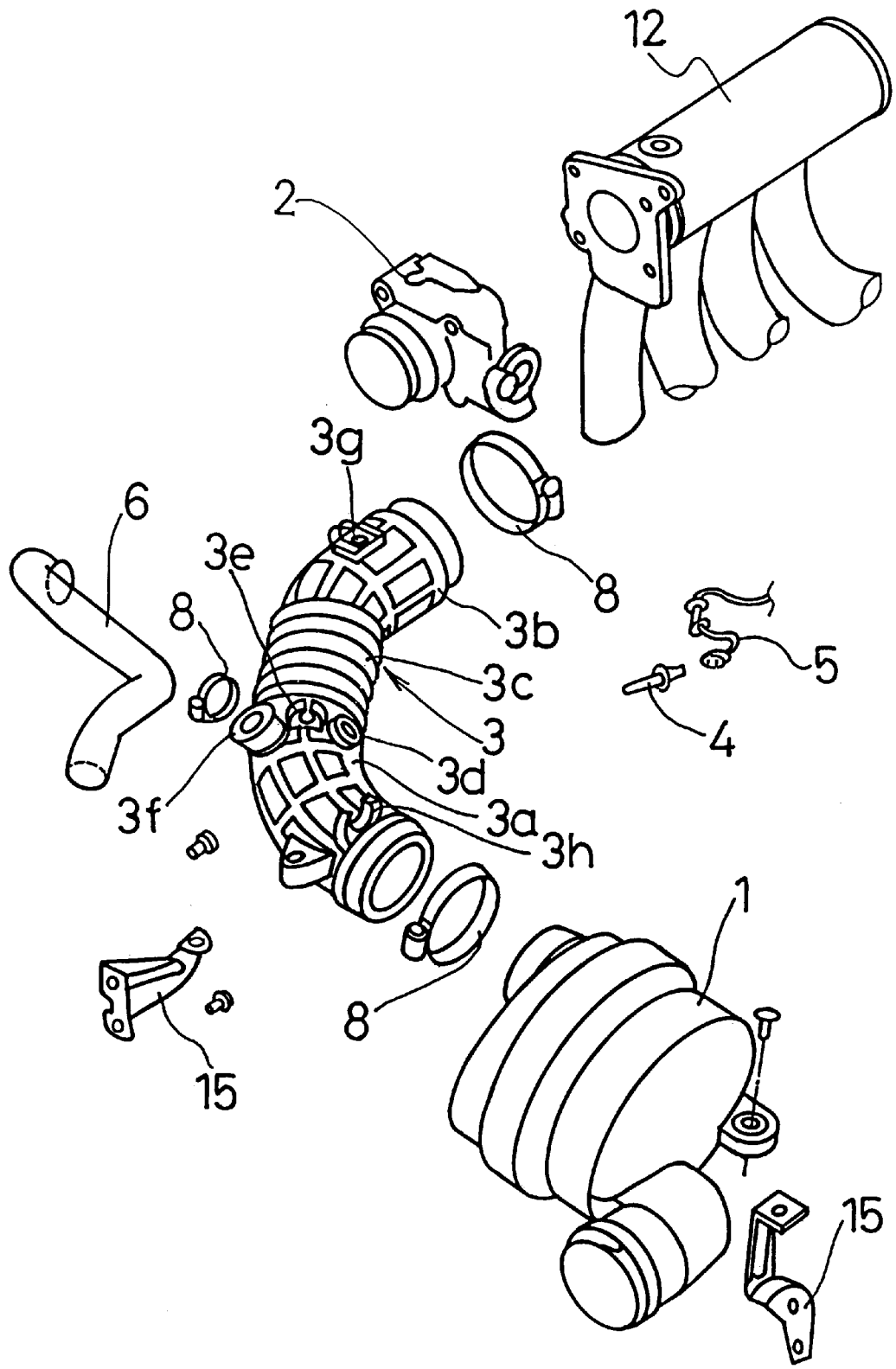
FIG. 3 a broken view of a suction system in an embodiment of the present invention.
Figure 4:
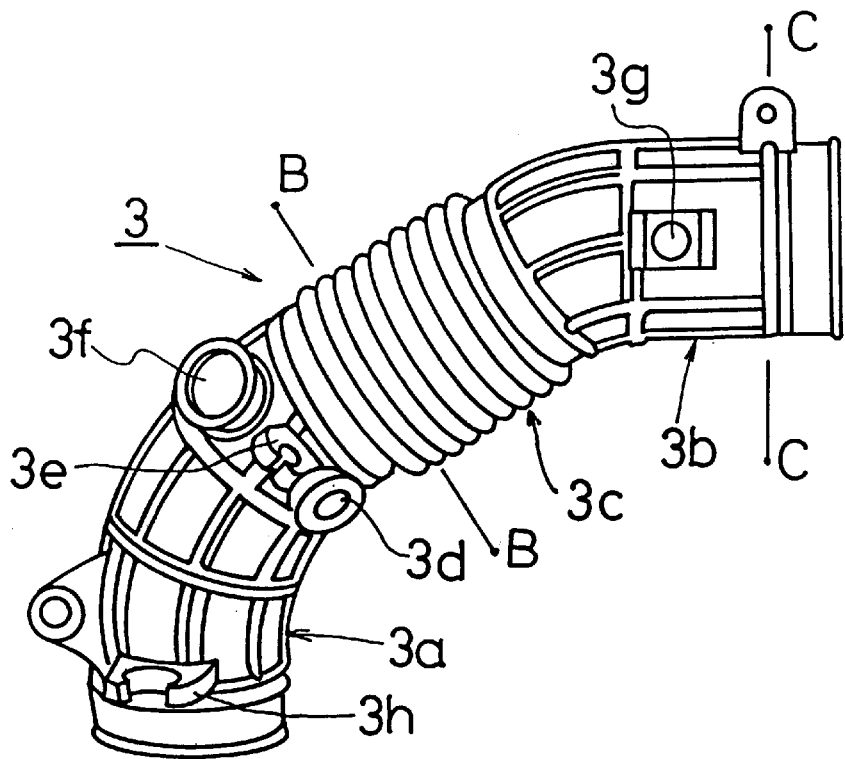
FIG. 4 is a plan view of the air-cleaner outlet hose shown in FIG. 1.

First, as shown in FIG. 3, an air-cleaner outlet hose 3 (see FIG. 4) which is provided in a suction system of a vehicle is disposed between an air-cleaner 1 and a throttle body 2 and connected by a clamp 8 to form a suction air path. And, the air-cleaner outlet hose 3 comprises, from the upstream in the suction air streaming direction, an upper cylinder portion 3a, a bellows portion 3c and a lower cylinder portion 3b. And, the upper cylinder portion 3a and the lower cylinder portion 3b are bent similarly in an arched figure with a little twisted relation with each other and substantially right angled as a whole.

Figure 1:
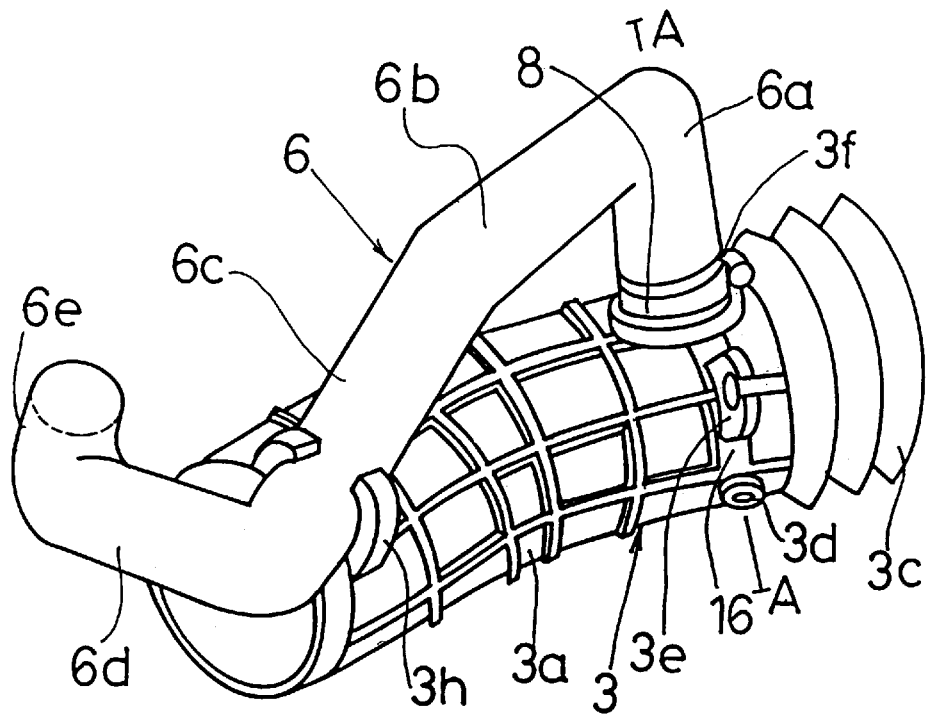
FIG. 1 is a perspective view of an air-cleaner outlet hose and a resonator in an embodiment of the present invention.
Figure 2:
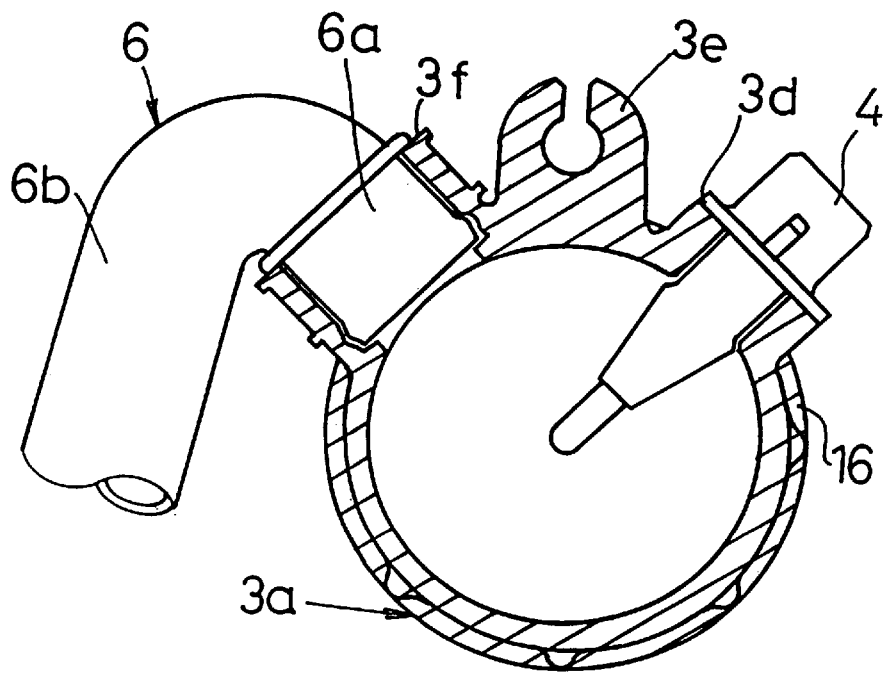
FIG. 2 is a sectional view along the line A—A of FIG. 1.

As shown in FIGS. 1 and 2, an annular lib 16 formed at the upper cylinder portion 3a at its downstream is provided with a mounting hole (hose connection portion) 3f into which the resonator 6 is pressed. Further, at the tip end of the upper cylinder portion 3a a resonator clamp portion 3h is formed.

As shown in FIG. 1, the resonator 6 is pressed into a mounting hole 3f with its base end 6a and its connecting portion is clamped by a clamp 8. The base end 6a of the resonator 6 is formed in such a manner as it extends in the radial direction of the upper cylinder portion 3a, at the intermediate portion 6b thereof, it is bent at an acute angle and extends straightly along the upper cylinder portion 3a, and at the intermediate portion 6c, it is bent so as to approach the upper cylinder portion 3a and supported by the resonator clamp portion 3h formed at the distal end of the upper cylinder portion 3a. At this point, the resonator 6 supported is bent and extends a little bit forward and slantwise-upward (free end 6d), and further bent and extends a little bit forward and slantwise-downward (in a direction which the resonator 6 is returned as a whole)(free end 6e).

Figures 5A, 5B:
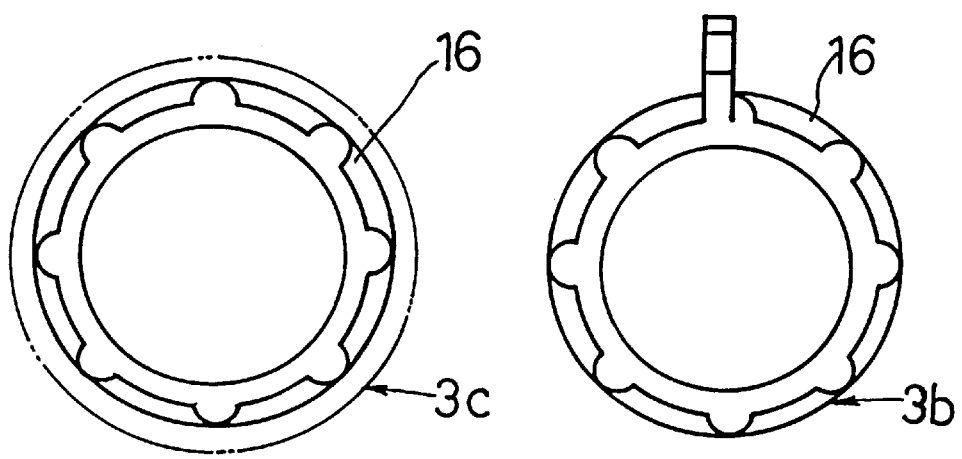
FIG. 5 (*a*) and (*b*) show sectional views of FIG. 4 along the lines B—B and C—C respectively.
Figure 6:
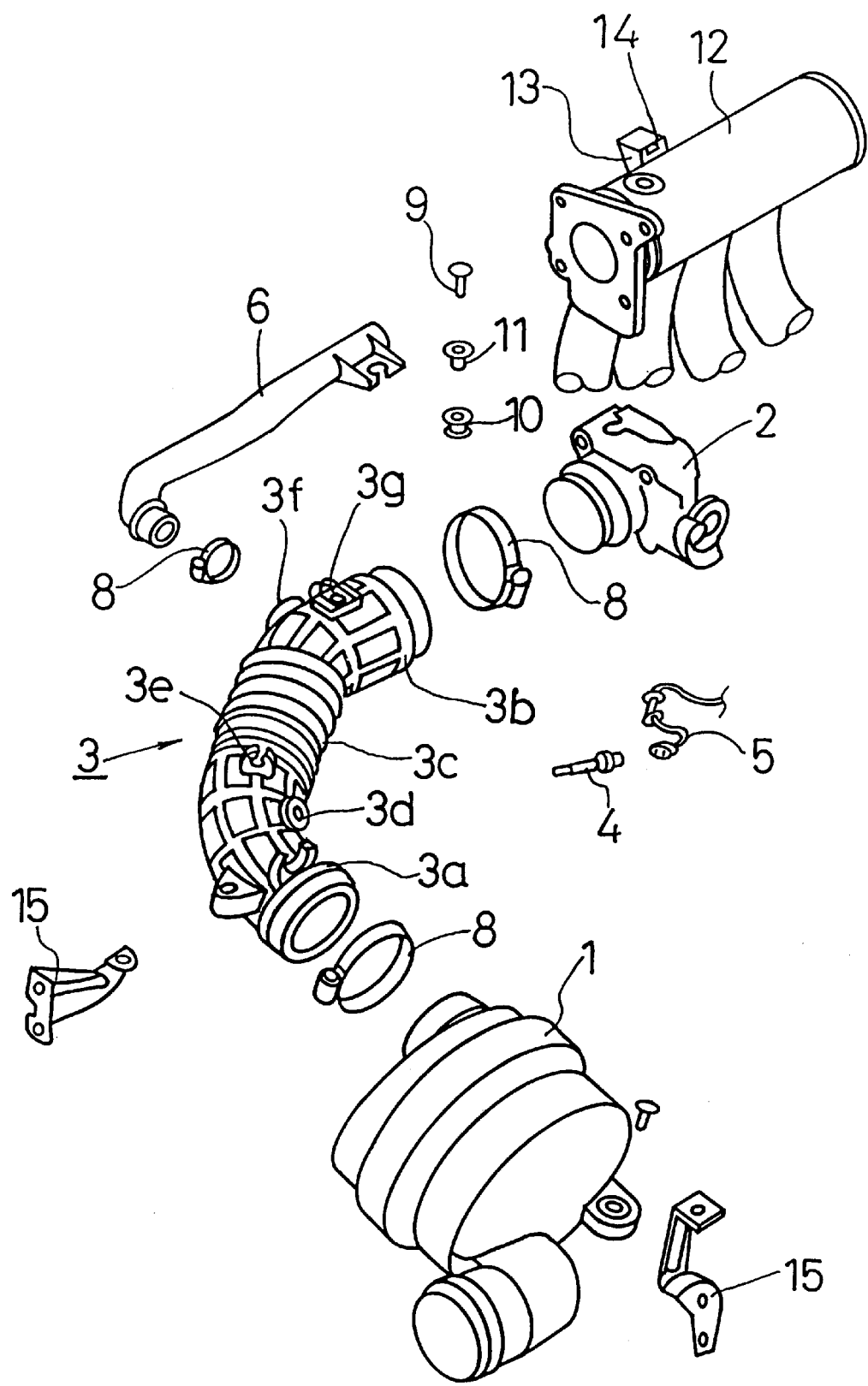
FIG. 6 is a broken view of a conventional suction system.
Figure 7:
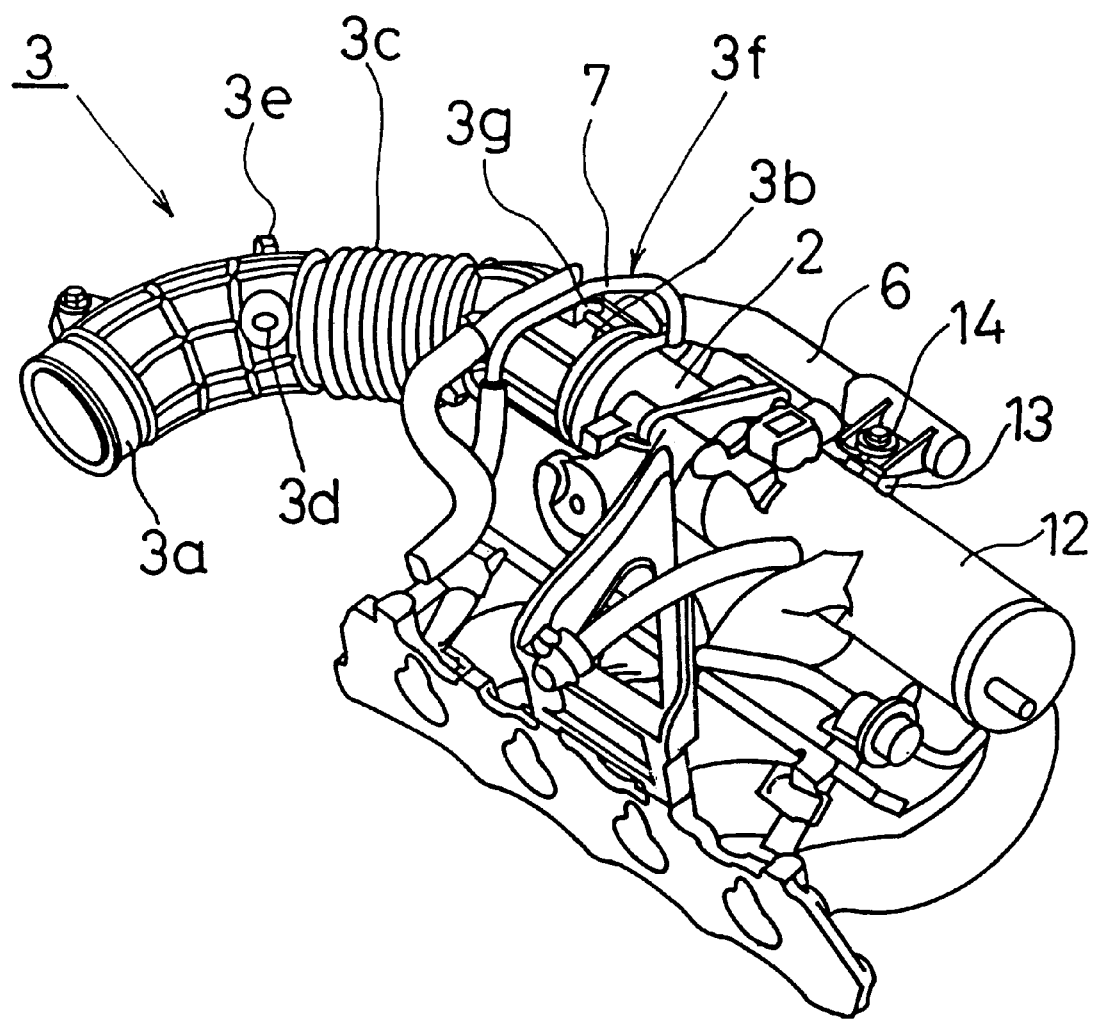
FIG. 7 is a perspective view of the conventional suction system shown in FIG. 6.

Further, as shown in FIGS. 1 and 2, the annular lib 16 is formed at a position close to the bellows portion 3c on the upper cylinder portion 3a and on this portion the resonator 6 is mounted. And, the mounting hole 3f of the resonator 6 and the mounting hole 3d of the the suction air temperature sensor 4 are disposed on a plane perpendicular to a center line of the air-cleaner outlet hose 3, the mounting hole 3d for the suction air temperature sensor 4 is provided at a position apart from a mounting position for the resonator 6 circumferentially by approximately 90° in angle and between the two holes and on the outer circumference of the air-cleaner outlet hose 3 the harness clamp portion 3e of the suction air temperature sensor 4 is provided. Further, annular libs 16 are formed also at the intermediate portion of the bellows portion 3c of the air-cleaner outlet hose 3 and at the downstream end of the lower cylinder portion 3b(see FIG. 4, FIG. 5(a) and FIG. 5(b)).

In the above constitution, the vibration of the engine is transmitted to the air-cleaner outlet hose 3 through the intake manifold 12 and the throttle body 2. To the resonator 6 the vibration is transmitted through the bellows portion 3c from the upper cylinder portion 3a as the connecting portion and the vibration transmitted through the bellows portion 3c vibrates the free ends 6d and 6e of the resonator 6 in such a manner as the resonator clamp portion 3h is a fulcrum. Thereby, it can make difficult to transmit the vibration to the vehicle body.

Further, compared with conventional art, the bolt 9, the cushion 10, the washer 11, the bracket 13 welded on the intake manifold 12 and the welding nut 14 become unnecessary to reduce the number of parts and the mounting work processes, and eventually the production cost can be saved.

Still further, on a plane perpendicular to the center line of the air-cleaner outlet hose 3 and its outer circumferential surface, by mounting the resonator 6 having a hardness higher (harder) than that of a rubber member and the like and the suction air temperature sensor 4, the resistance against the negative pressure of the air-cleaner outlet hose 3 is increased.

Still further, since the position of the suction air temperature sensor 4 is deviated from the opposing one to the position of the resonator 6, even when the negative pressure which is greater than the one against which the air-cleaner outlet hose 3 can resist occurs, the suction air temperature sensor 4 is not threatened to enter the opening of the resonator 6, and in addition, since the suction air temperature sensor 4 is projected to the inner path of the hose, even at the time when the inner wall of the hose 3 becomes likely to be deformed inside, the suction air temperature sensor 4 functions as a stopper against such deformation of the wall to secure approximately one half of an sectional area of the path and prevent the path from being closed and an actuation of the engine from being abruptly deteriorated.

Now, mentioning a case where the negative pressure greater than the one against which the hose can resist occurs, it is the case where an air-cleaner element has not been replaced with a new one after the time limit for replacement lapsed.

As explained above, since, in the present invention, the resonator is supported in a floating manner at the upstream of the air-cleaner outlet hose, the reduction of the vibration transmitted to a vehicle chamber, the number of parts, the mounting processes and the cost down can be realized. Further, since the resonator is of the type of side branch, in the narrow space of the engine room, a long resonator can be provided and a noise reduction performance can be effective to the low frequency region.

Further, since the resonator and the suction air temperature sensor are disposed on the outer circumference of the air-cleaner outlet hose, the rigidity thereof is increased, and the resistance against the negative pressure is also increased so that the reliability is further increased.

And, at the time of mounting the resonator, since the configuration thereof is not symmetrical, if holding it at the bending portion thereof, the direction of the resonator is determined as one direction, the mounting work becomes easy.

Incidentally, the disposition of hose connecting portion 3f is not limited to as explained above. It can be provided on any portion of the air-cleaner outlet hose, for example, on the lower cylinder portion 3b.

What is claimed is:

1. A structure of a suction pipe for an engine comprising:
   an air-cleaner outlet hose,
   a hose connecting portion provided on the air-cleaner outlet hose, and
   a resonator having a first end, an intermediate portion and a second end,
   said first end being connected to the hose connecting portion,
   said intermediate portion being fixed to a position different from said position of the hose connecting portion on the air-cleaner outlet hose such that said resonator is supported so as to leave said second end in a floating manner as a free end.

2. A structure of suction pipe for an engine according to claim 1, wherein the air-cleaner outlet hose is comprised of an upper cylinder portion and a lower cylinder portion,
   the hose connecting portion is provided at a downstream portion of the upper cylinder portion, and a resonator clamp portion is provided in a unit with the upper cylinder portion at an upstream portion of the upper cylinder portion.

3. A structure of a suction pipe for an engine comprising:

an air-cleaner outlet hose, wherein the air-cleaner outlet hose is comprised of an upper cylinder portion, a lower cylinder portion and a bellows portion therebetween, an annular rib provided on the air cleaner outlet hose as a reinforcing member close to the bellows portion, a resonator and a suction air temperature sensor are provided on the annular rib in such a manner as they are positioned on a plane perpendicular to a center line of the air-cleaner outlet hose, and a harness clamp portion for the sensor is provided on the annular rib.

4. A structure of a suction pipe for an engine according to claim 3, wherein said resonator and said suction air temperature sensor are provided as the reinforcing member in such a manner as a position of the sensor is deviated from an opposing position of the resonator in a circumferential direction.

* * * * *